US010838624B2

(12) United States Patent
Watkins et al.

(10) Patent No.: US 10,838,624 B2
(45) Date of Patent: Nov. 17, 2020

(54) EXTENT POOL ALLOCATIONS BASED ON FILE SYSTEM INSTANCE IDENTIFIERS

(71) Applicant: HEWLETT PACKARD ENTERPRISE DEVELOPMENT LP, Houston, TX (US)

(72) Inventors: Glenn S. Watkins, Northborough, MA (US); Curtis Mello, Berkley, MA (US); Michael Champigny, Barre, MA (US); John Michael Czerkowicz, Wakefield, MA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 339 days.

(21) Appl. No.: 15/885,446

(22) Filed: Jan. 31, 2018

(65) Prior Publication Data

US 2019/0235761 A1  Aug. 1, 2019

(51) Int. Cl.
*G06F 3/06* (2006.01)
*G06F 9/455* (2018.01)
*G06F 16/11* (2019.01)

(52) U.S. Cl.
CPC .......... *G06F 3/0611* (2013.01); *G06F 3/0619* (2013.01); *G06F 3/0631* (2013.01); *G06F 3/0644* (2013.01); *G06F 3/0665* (2013.01); *G06F 3/0689* (2013.01); *G06F 9/45533* (2013.01); *G06F 9/45558* (2013.01); *G06F 16/122* (2019.01); *G06F 2009/45579* (2013.01)

(58) Field of Classification Search
CPC ..... G06F 3/0611; G06F 16/122; G06F 3/0619
See application file for complete search history.

(56) References Cited

U.S. PATENT DOCUMENTS

| 6,453,392 | B1 | 9/2002 | Flynn, Jr. |
| 7,620,766 | B1 | 11/2009 | Waldspurger |
| 8,151,033 | B2 | 4/2012 | Dake |
| 9,032,176 | B2 | 5/2015 | Shaikh et al. |
| 9,052,938 | B1 | 6/2015 | Bhide et al. |
| 9,201,677 | B2 | 12/2015 | Joshi et al. |
| 9,389,901 | B2 | 7/2016 | Saladi et al. |
| 9,697,130 | B2 | 7/2017 | Karippara et al. |

(Continued)

FOREIGN PATENT DOCUMENTS

WO  WO-2016164471 A1  10/2016

OTHER PUBLICATIONS

Moniruzzaman et al., "Virtual Memory Streaming Technique for Virtual Machines (VMs) for Rapid Scaling and High Performance in Cloud Environment," Jun. 22, 2014, pp. 1-6, arXiv.org.

(Continued)

*Primary Examiner* — Loc Tran
(74) *Attorney, Agent, or Firm* — Jaffery Watson Mendonsa & Hamilton

(57) ABSTRACT

Example implementations relate to allocating an I/O request. In an example, a demultiplexer may forward an I/O request to a file system instance to which the I/O request belongs. The file system instance may tag the I/O request with a file system instance identifier associated with that file system instance. A volume manager may identify an extent pool to which the I/O request is to be allocated from among a plurality of extent pools of a storage based on the file system instance identifier tagged to the I/O request.

20 Claims, 5 Drawing Sheets

(56) References Cited

U.S. PATENT DOCUMENTS

| | | | |
|---|---|---|---|
| 2009/0240678 A1* | 9/2009 | Sadovsky | G06F 16/40 |
| 2009/0254695 A1* | 10/2009 | Deguchi | G06F 3/067 |
| | | | 711/100 |
| 2010/0161929 A1 | 6/2010 | Nation et al. | |
| 2017/0161204 A1 | 6/2017 | Roberts et al. | |
| 2018/0095789 A1* | 4/2018 | Zhang | G06F 3/0656 |

OTHER PUBLICATIONS

Roberto Mijat and Andy Nightingale, "Virtualization is Coming to a Platform Near You," White Paper, 2010, pp. 1-12, ARM Limited.

Sukwoo Kang and A.L. Narasimha Reddy, "An Approach to Virtual Allocation in Storage Systems," 2006, pp. 1-27, vol. 1, No. 1, ACM.

* cited by examiner

EXTENT POOL ALLOCATIONS BASED ON FILE SYSTEM INSTANCE IDENTIFIERS

BACKGROUND

Computing systems may employ virtualization. In some instances of virtualization, multiple virtual machines may share hardware resources, such as processing resources or storage.

BRIEF DESCRIPTION OF THE DRAWINGS

Various examples will be described below with reference to the following figures.

DETAILED DESCRIPTION

Virtualized computing systems may deploy and run individual virtual machines (or other types of individualized instances of software, such as containers) on shared hardware resources, such as compute, storage, or networking resources. When multiple virtual machines perform writes to the underlying storage resource concurrently or at substantially the same time, the writes of different virtual machines may be allocated on the storage resource in a blended fashion. In other words, blocks of data of one virtual machine may be mixed or interleaved with blocks of data of another virtual machine. This phenomenon may be referred to as the input/output (I/O) blender effect.

The blender effect may result in various inefficiencies. For example, read latencies may be increased due to the dispersion of data blocks. In another example, when a virtual machine or its associated data (e.g., a data snapshot) is deleted and deallocated, any other virtual machine data with which the deallocated data was interleaved may become fragmented. Fragmented data may pose problems for parity-based RAID systems, particularly used to protect data on multiple storage disks, as new data cannot be written to the fragmentation holes within a RAID stripe without the parity block also being updated. A system failure while writing data to the holes and updating the parity block may lead to data corruption in the event of a future storage disk failure. Fragmented RAID stripes are moved and defragmented to avoid such failures and to regain usable storage capacity, which may result in extra work for the system.

Accordingly, it may be useful to observe locality when writing data from the same virtual machine. Examples disclosed herein may relate to, among other things, receiving an I/O request at a demultiplexer, forwarding the I/O request from the demultiplexer to a file system instance to which the I/O request belongs, tagging by the file system instance the I/O request with a file system instance identifier, and identifying by a volume manager an extent pool (e.g., an extent being a contiguous block of storage) to which the I/O request is to be allocated from among a plurality of extent pools of a storage based on the file system instance identifier tagged to the I/O request. In some implementations, the demultiplexer, the file system instances, and the volume manager may form components of an object tree-based file system that stores signatures of each data object and metadata object in the tree.

By virtue of writing data for a given virtual machine to the same extent pool, data from the given virtual machine may be kept together, and the likelihood is increased that an entire extent or range of data in an extent is freed together in a deallocation event. Thus, extra work associated with managing fragmentation may be avoided, for example.

Figure 1:
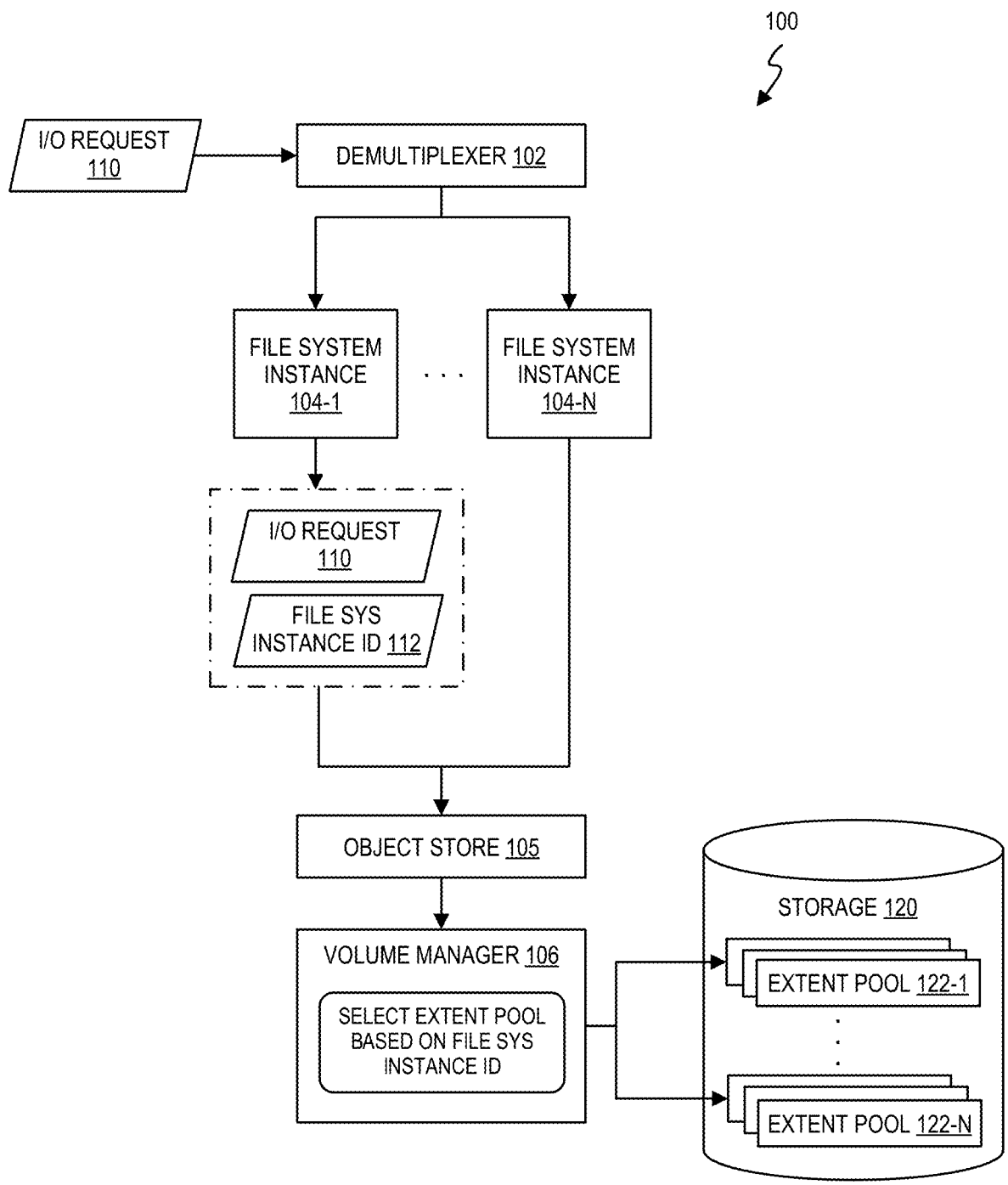
FIG. 1 is a block diagram depicting an example system that identifies an extent pool based on a file system instance identifier.

FIG. 1 is a block diagram depicting an example system 100. In an example, the system 100 may form a part of a hyperconverged appliance in which various information technology resources, such as compute, storage, networking, and virtualization resources, are tightly integrated at least in part by software-defined intelligence.

For example, the system 100 in part or in whole may provide software defined storage, and in particular, may form part of an object-based file system. In such a system, all data of the system 100 may be stored as objects in an object store. A file of the virtual machine may be represented by a plurality of objects, for example. Each object may be identified by a signature (also referred to as an object fingerprint), which, in some implementations, may be a cryptographic hash of the content of the associated object. Objects may be hierarchically related to a root object in an object tree (e.g., a Merkle tree) or any other hierarchical arrangement (e.g., directed acyclic graphs, etc.). Leaf nodes of the tree may be data objects used to store opaque user data, and the root and internal nodes may be metadata objects used to store signatures of child objects and other attributes or information. The root object may have a signature derived from all the objects in the object tree. An object index data structure may include object records associated for each object, and each object record may include a signature of the object, a reference count, and a physical address of the object. The reference count may keep track of the number of times the object is referenced, which may provide native deduplication to the system 100, among other features.

Virtual machines (or other type of concurrent independent software instances) may interface with the system 100. Each virtual machine may be associated with a data set specific to that virtual machine. In particular, each virtual machine may be associated with a hierarchical object tree that can be addressed by the root object signature of that tree. Each virtual machine may also be associated with a respective self-contained file system instance 104-1 through 104-N (referred to generally as an individual instance 104 or the collective instances 104), which manage the object tree of the corresponding file system instance 104. In some examples, a file system instance 104 may be referred to as a hive. When a virtual machine is created or destroyed, the corresponding file system instance 104 also may be created or destroyed.

In the system 100, virtual machines may issue I/O requests, such as I/O request 110. In some cases, the I/O request 110 may be a request to write data to a physical storage 120, which may include one or more hard disk drive(s), solid state drive(s), or other forms of persistent storage. The data may be opaque user data or other data. Other types of I/O requests may also be contemplated. As will now be described, the I/O requests may flow downstream to a demultiplexer 102, to a file system instance 104, to an object store 105, to a volume manager 106, and to the storage 120. At least some of the foregoing components may together form a storage stack.

The demultiplexer 102 receives I/O requests, such as those issued by multiple various virtual machines. The demultiplexer 102 forwards the I/O requests to the file system instances 104 based on a determination of to which of the file system instances 104 each of the I/O requests belong. In other words, the demultiplexer 102 distributes I/O requests to the file system instance 104 associated with the virtual machine issuing the I/O request. In an example, I/O requests may be accompanied by a handle encoded with an inode number and an offset, which collectively may be referred to herein as a file address for convenience. The demultiplexer 102 may translate information of the handle to determine to which file system instance 104 the I/O request is directed. In other examples, virtual machines may use different client protocols with different file address semantics, which the system 100 may process in a similar fashion. For illustration purposes, FIG. 1 depicts an example where the demultiplexer 102 determines that the I/O request 110 is addressing the file system instance 104-1, or in other words, the I/O request 110 belongs to the file system instance 104-1.

The file system instance 104-1 translates the file address of the I/O request 110 to a signature in the associated object tree. In some cases, the signature may not exist, i.e., if I/O request 110 is to write new data, and storage will be allocated from the storage 120 via the volume manager 106. The file system instance 104-1 may coordinate generation of artifacts involved in storing new data, such as a signature, metadata object, etc. Metadata objects generated by a file system instance may be stored to the object store 105 and written to the storage 120.

The file system instance 104-1 tags the I/O request 110 with a file system instance identifier 112 associated with the file system instance 104-1. The file system instance identifier 112 may be a numerical identifier, for example. The file system instance identifier 112 is passed downstream in the storage stack with the tagged I/O request 110 (e.g., carried on the thread handling the I/O request or passed as arguments to function calls). In some instances, the file system instance 104-1 may have created a new metadata object that is handled by an I/O request separate from the I/O request 110 from a virtual machine, but also proceeds down the storage stack from the file system instance 104 towards the volume manager 106 and storage 120. Such an I/O request to write a metadata object also may be tagged with a file system instance identifier.

In some implementations, the file system instances 104-1 through 104-N may have different respective file system instance identifiers for tagging I/O requests. For example, the file system instance 104-1 may tag its associated I/O requests with a different identifier than the file system instance 104-N tags its associated I/O requests.

The file system instances 104 may pass their I/O requests down to the object store 105. In some examples, the object store 105 manages the object index and may perform inline deduplication on I/O requests, among other things. For example, an I/O request may write data that includes an object that already exists in the storage 120 (e.g., when a metadata object is written that references the object signature of an existing object), and the object store 105 may use a signature of that object from the file system instance 104 to locate an associated object record in the object index and may increment the associated reference count in the object record instead of writing the object again to the storage 120.

If an object does not exist (i.e., the I/O request 110 relates to writing new data) as may be indicated by the signature not existing in the file system instance 104-1, the object store 105 may request a new storage allocation from the volume manager 106. The object store 105 may pass the file system instance identifier 112 with the I/O request down to the volume manager 106.

The volume manager 106 manages storage layout on the storage 120 and provides storage block allocation to the object store 105. The volume manager 106 may create an extent (also referred to as a mini-volume) from contiguous blocks of the storage 120, and may create an extent pool from a plurality of extents, that is, an extent pool may be formed from a group of extents. The volume manager 106 may also create a plurality of extent pools 122-1 through 122-N (referred to collectively as extent pools 122 or generally as an individual extent pool 122). In some implementations, object size within an extent may be the same. In some implementations, different extents may have different object sizes.

In some implementations, the storage 120 may have storage tiers that differ in terms of performance or other characteristics. For example, the storage tiers may perform differently corresponding to different media types that collectively form the storage 120 (e.g., solid-state disk, hard disk drive, etc.). The volume manager 106 may create an extent pool from extents created from different tiers. Thus, an extent pool may span different storage tiers.

Upon receiving the I/O request 110, the volume manager 106 identifies and selects an extent pool, e.g., extent pool 122-1 for illustration purposes, from among the plurality of extent pools 122 of the storage 120 based on the file system instance identifier 112 passed downstream with the tagged I/O request 110. In an example implementation, the volume manager 106 may identify the extent pool 122-1 by hashing the file system instance identifier 112 of the tagged I/O request (e.g., via a hash table). Other techniques for correlating a file system instance identifier 112 to an extent pool 122-1 also may be utilized.

The volume manager 106 allocates the tagged I/O request 110 to that identified extent pool 122-1. Moreover, the volume manager 106 may allocate a block or blocks within the identified extent pool 122-1 to store data associated with the I/O request 110. By virtue of tagging the I/O request 110 with the file system instance identifier 112 and identifying an extent pool 122 based on the identifier 112, allocations for data from a given virtual machine may be grouped together which may decrease I/O blender effect and fragmentation over time.

In some implementations, the quantity of file system instances 104 (and by extension, the quantity of virtual machines accessing the system 100) is the same as or less than the quantity of the extent pools 122, in which case, each file system instance 104 is allocated to an extent pool on a one-to-one basis. In some implementations, the quantity of file system instances 104 is greater than a quantity of the extent pools 122, in which case, multiple file system instances may write data to the same extent pool, whether as determined by hash table or other techniques. In such instances, the I/O blender effect also may be reduced.

The object store 105 may be useful for decoupling how data is organized at upper levels of the stack (e.g., at a virtual machine operating system level) from how data is stored at lower levels of the stack (e.g., on physical storage) for flexibility and performance. The file system instance identifier 112 passed down the storage stack with the I/O request 110 (or an I/O request to write a metadata object generated by a file system instance) may be deemed an example of context data that can assist the volume manager 106 to optimize how data is stored on the physical storage 120.

In some implementations, additional or alternative information may form the context data in part or in whole. For example, a priority identifier may serve as context data. The file system instance 104-1 may tag the I/O request 110 with a priority identifier, which may be provided by a virtual machine upstream of system 100, by a file system instance 104 (e.g., for a metadata object), or by another source. The volume manager 106 may then identify, within the extent pool 122-1 (which may be initially identified from among the plurality of extent pools 122 based on the file system instance identifier 112, as described above) a particular tier from among different tiers to which the tagged I/O request 110 is to be allocated. As an illustration, the extent pool 122-1 may be composed of a hot tier (faster storage) and a cold tier (slower storage), and when an I/O request is to write a metadata object, a priority identifier may indicate to the volume manager 106 to write the I/O request to the hot tier. As another illustration, when an I/O request is to restore data from a backup, a priority identifier may indicate to the volume manager 106 to write such an I/O request to the cold tier.

In some implementations, the file address may serve as context data. For example, the I/O request 110 as received by the demultiplexer 102 includes a file address, and the file system instance 104-1 may pass the file address downstream opaquely with the tagged I/O request 110. The volume manager 106 may modify allocation of the tagged I/O request 110 within the identified extent pool 122-1 based on the file address.

For example, it may be useful to keep frequently used related objects in a hot tier of storage, instead of allowing a migration algorithm to automatically move those objects to a cold tier. Thus, in an example implementation, the volume manager 106 may modify allocation of the tagged I/O request 110 within the identified extent pool 122-1 by preventing migration of data related to the tagged I/O request 110 in response to a high frequency of occurrence related to the file address. For example, the volume manager 106 may utilize a least recently used (LRU) policy, or other usage policies, for a range of bytes, extents, or virtual blocks, to guide tier migration behavior for a related group of objects.

In another example, it may be useful to match a physical layout of storage to a logical layout utilized at upper levels of the storage stack (e.g., by the virtual machine client protocol) and/or to leverage certain layouts that are more performant on certain storage media such as sequential access. In an example implementation, the volume manager 106 may modify allocation of the tagged I/O request 110 within the identified extent pool 122-1 by allocating the tagged I/O request 110 to a portion of the extent pool 122-1 in a physical layout that matches a logical layout associated with the file address passed down. For example, the volume manager 106 may organize physical storage allocations for I/O requests within an extent 122 to correspond to adjacencies of the inodes and offsets of file addresses associated with those I/O requests. In this manner, a megabyte of contiguous logical file may correspond to a megabyte of contiguous physical storage for example, which may improve performance at read time.

In some implementations, a tiering hint may serve as context data. In some implementations, the file system instance 104-1 may tag the I/O request 110 with a tiering hint to either permit or prevent tier migration. The volume manager 106 may respond to the tiering hint to prevent tier migration of data related to the I/O request 110, once the I/O request has been allocated to the identified extent pool 122-1. For example, the volume manager 106 may communicate with a backend tier migration component to prevent migration for the associated object. A tiering hint may be useful for data that is predetermined or known upfront to not need migration (e.g., is short lived, will always reside in cold or hot tier, etc.)

Various components and aspects of the system 100 described above, including any or all of the demultiplexer 102, the file system instances 104, the object store 105, and the volume manager 106, may be implemented as any combination of hardware and programming to implement the functionalities described herein. In some implementations, the programming may be processor executable instructions stored on a non-transitory machine-readable storage medium, and the hardware may include at least one processing resource to retrieve and/or execute those instructions. Example processing resources include a microcontroller, a microprocessor, central processing unit core(s), an application-specific integrated circuit (ASIC), a field programmable gate array (FPGA), etc. Example non-transitory machine readable medium include random access memory (RAM), read-only memory (ROM), electrically erasable programmable read-only memory (EEPROM), flash memory, a hard disk drive, etc. The term "non-transitory" does not encompass transitory propagating signals. Additionally or alternatively, components of the system 100 may include electronic circuitry or logic for implementing functionality described herein. In some implementations, components of the system 100 may be implemented in a virtual machine that executes on a hardware processor. The components of the system 100 (the demultiplexer 102, the file system instances 104, the object store 105, the volume manager 106, etc.) may be discrete in some implementations or may be in any combination in some implementations.

Figure 2:
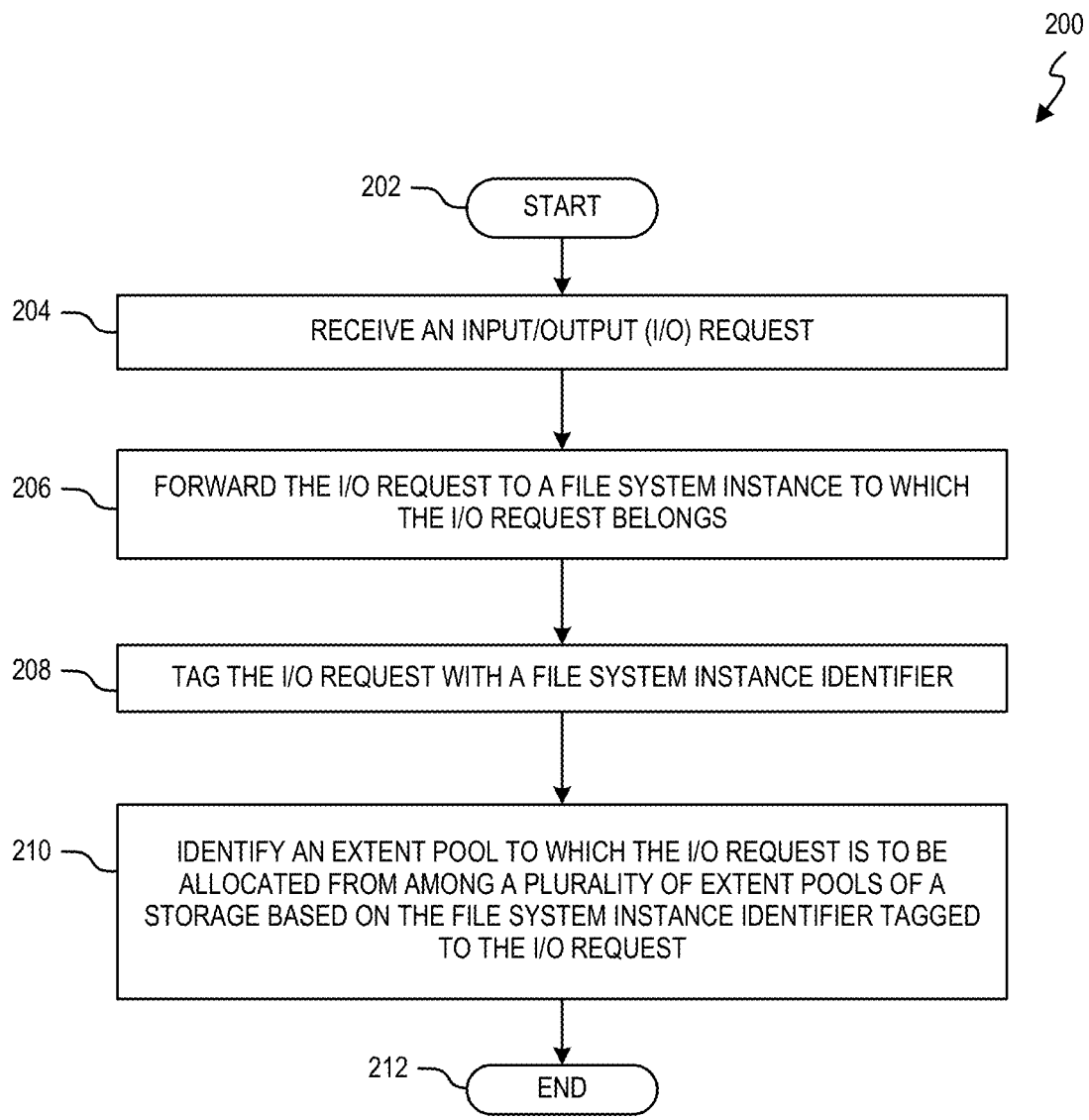
FIG. 2 is a flow diagram depicting an example method to identify an extent pool based on a file system instance identifier.
Figure 3:
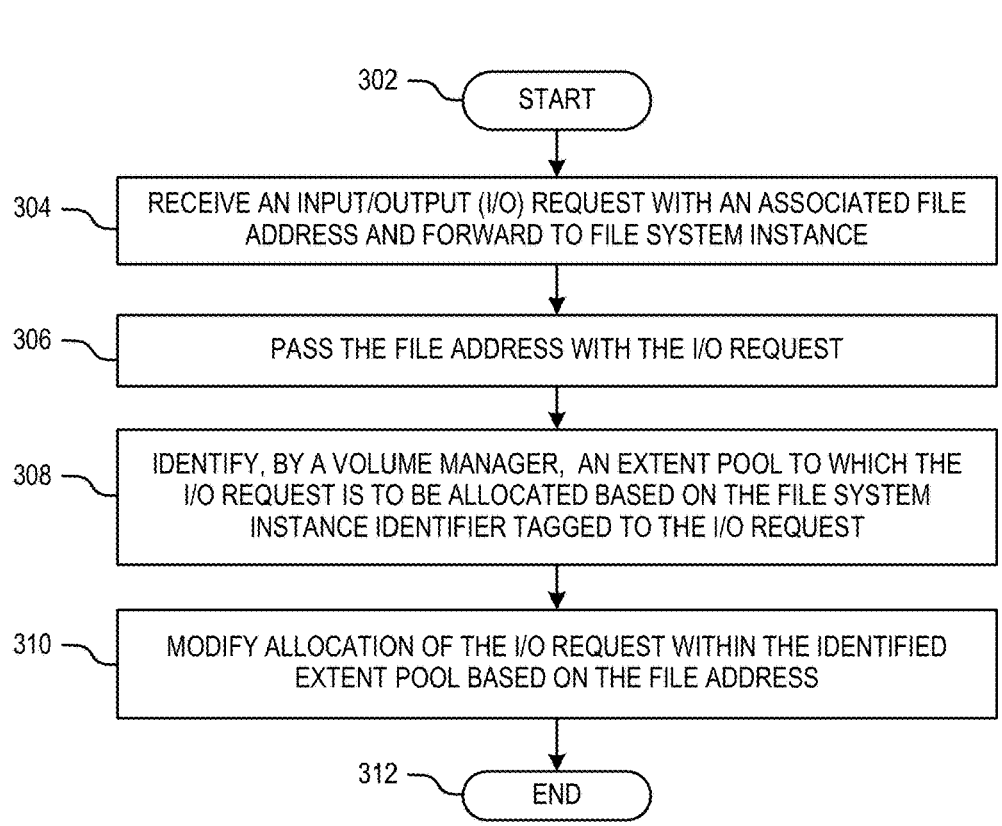
FIG. 3 is a flow diagram depicting an example method to identify an extent pool based on a file system instance identifier and to allocate within the extent pool.
Figure 4:
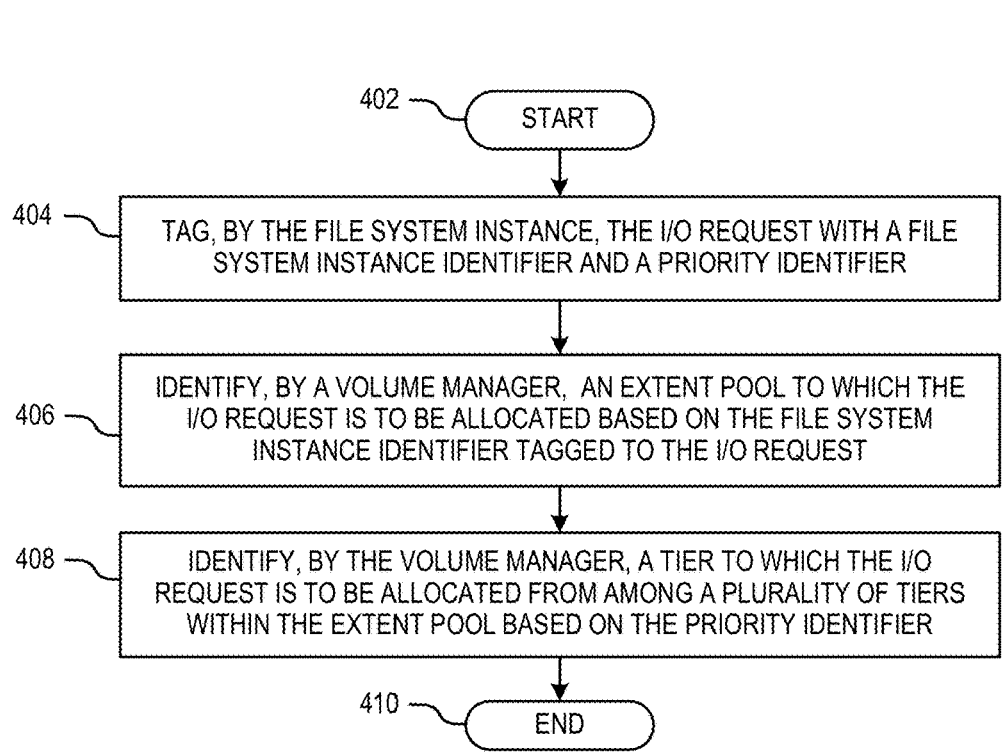
FIG. 4 is a flow diagram depicting an example method to identify an extent pool based on a file system instance identifier and to allocate within the extent pool.

FIGS. 2-4 are flow diagrams depicting various example methods. In some implementations, one or more blocks of a method may be executed substantially concurrently or in a different order than shown. In some implementations, a method may include more or fewer blocks than are shown. In some implementations, one or more of the blocks of a method may, at certain times, be ongoing and/or may repeat.

The methods may be implemented in the form of executable instructions stored on a machine readable medium and executed by a processing resource and/or in the form of electronic circuitry. For example, the methods below are described as being performed in part or in whole by the system 100, and in particular by the demultiplexer 102, the file system instances 104, the object store 105, the volume manager 106, etc.

FIG. 2 is a flow diagram depicting an example method 200 for identifying an extent pool based on a file system instance identifier. The method 200 starts at block 202 and continues to block 204 where a demultiplexer 102 receives an I/O request 110, such as a request to write data to the storage 120. In some implementations, the demultiplexer 102 may receive I/O requests from multiple different virtual machines.

At block 206, the demultiplexer 102 forwards the I/O request 110 to a file system instance 104-1 to which the I/O request belongs. In some examples, there may be a plurality of file system instances 104, each file system instance corresponding to a different virtual machine. The file system instance 104-1 may be useful for translating a file address of the I/O request 110 to an object signature in an object tree.

At block 208, the file system instance 104-1 tags the I/O request 110 with a file system instance identifier 112 associated with the file system instance 104-1. Where there are multiple file system instances 104, each of the file system instances 104 may have a different respective file system instance identifier for tagging I/O requests forwarded to those file system instances 104 by the demultiplexer 102.

The file system instance 104-1 passes the I/O request 110 with the file system identifier 112 down the storage stack. In some examples, the file system instance 104 may pass the I/O request 104 to an object store 105 that may perform, at least in part, inline deduplication. The I/O request 110 may reach a volume manager 106, which may manage extents and extent pools 122 created from the storage 120 and block storage allocation to those extent pools 122 and storage 120.

At block 210, the volume manager 106 may identify an extent pool 122-1 to which the I/O request 110 is to be allocated from among a plurality of extent pools 122 of the storage 120 based on the file system instance identifier 112 tagged to the I/O request 110. For example, to identify the extent pool 122-1, the volume manager 106 may hash the file system instance identifier 112 of the tagged I/O request 110.

The I/O request may then be carried out to write data to the identified extent pool 122-1. At block 212, the method 200 ends.

FIG. 3 is a flow diagram depicting an example method 300 for identifying an extent pool and allocating storage within the extent pool. The method 300 starts at block 302 and continues to block 304 where a demultiplexer 102 receives an I/O request 110 (e.g., a request to write data) that also includes a file address (e.g., an inode number and offset, or other addressing depending on the client protocol) and the demultiplexer 102 forwards the I/O request 110 to a file system instance 104-1 to which the I/O request 110 belongs. For example, aspects of block 304 may be similar to aspects of blocks 204 and 206 described above.

At block 306, the file system instance 104-1 passes the file address together with the I/O request 110 down the storage stack. For example, the I/O request 110 may be passed to an object store 105 and then to a volume manager 106. At block 306, the file system instance 104-1 also may tag the I/O request 110 with a file system instance identifier 112 that is also passed down the storage stack, as described above with respect to, e.g., block 208.

At block 308, the volume manager 106 receives the I/O request 110 with the file address and the file system instance identifier 112, and identifies an extent pool 122-1 from among a plurality of extent pools 112 to allocate the I/O request 110 based on the file system instance identifier 112. For example, block 308 may be analogous in many respects to block 210 described above.

At block 310, the volume manager 106 modifies allocation of the I/O request 110 within the extent pool identified at block 308, based on the file address passed down with the I/O request 110. Thus, the file address may provide additional context useful for optimizing allocation of data. In an implementation, the modification may include preventing tier migration of data related to the I/O request 110 in response to a high frequency of occurrence related to the file address. In another implementation, the modification may include allocating the I/O request 110 to a portion of the identified extent pool 122-1 in a physical layout that matches a logical layout associated with the file address. At block 312, the method 300 ends.

FIG. 4 is a flow diagram depicting an example method 400 for identifying an extent pool and allocating storage within the extent pool. In some implementations, activity analogous to blocks 204, 206, 208 may occur prior to method 400 to pass an I/O request 110 through the file system instance 104-1 for tagging with a file system instance identifier 112 and then control may pass to method 400. The method 400 starts at block 402 and continues to block 404 where the file system instance 104-1 may tag the I/O request 110 with a priority identifier. Additionally or alternatively, in some implementations, the file system instance 104-1 may tag the I/O request 110 with a tiering hint. The file system instance 104-1 then passes the I/O request 110 down a storage stack towards a volume manager 106. In some implementations, the tagged I/O request may be related to an object (e.g., metadata object) generated by a file system instance 104.

At block 406, the volume manager 106 identifies an extent pool 122-1 to which the I/O request 110 is to be allocated based on the file system instance identifier 112. Block 406 may be analogous in many respects to block 210 or 308 described above.

At block 408, the volume manager 106 identifies a tier (e.g., fast or slow storage, or hot or cold tier) within the extent pool 122-1 to allocate the I/O request 110 based on the priority identifier. If the I/O request 110 is tagged with a tiering hint, the volume manager 106 controls a tier migration component to either prevent or allow automatic tier migration of data associated with the I/O request 110 after the data has been written to the extent pool 122-1. The method 400 ends at block 410.

It may be understood that method 200 may allocate an I/O request across different extent pools and methods 300 and 400 may allocate an I/O request within an extent pool. In some implementations, aspects of methods 300 and 400 may be combined.

Figure 5:
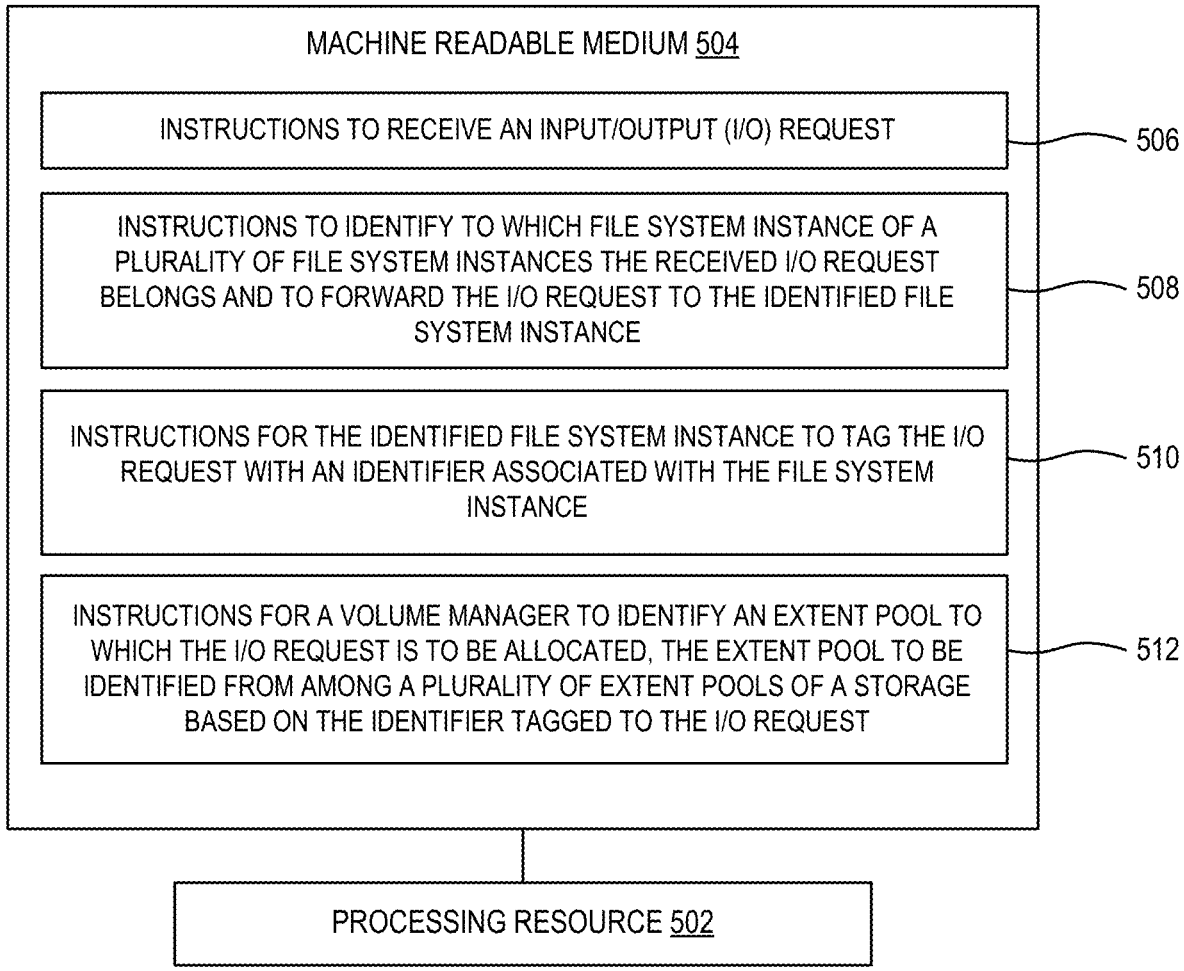
FIG. 5 is a block diagram depicting a non-transitory, machine readable medium encoded with example instructions to identify an extent pool based on a file system instance identifier.

FIG. 5 depicts a processing resource 502 coupled to a non-transitory, machine readable medium 504 encoded with example instructions. The processing resource 502 may include a microcontroller, a microprocessor, central processing unit core(s), an ASIC, an FPGA, and/or other hardware device suitable for retrieval and/or execution of instructions from the machine readable medium 504 to perform functions related to various examples. Additionally or alternatively, the processing resource 502 may include electronic circuitry for performing the functionality of the instructions described herein.

The machine readable medium 504 may be any medium suitable for storing executable instructions, such as RAM, ROM, EEPROM, flash memory, a hard disk drive, an optical disc, or the like. The machine readable medium 504 may be disposed within a system (e.g., a server or the like), in which case the executable instructions may be deemed "installed" on or "embedded" in the system. Alternatively, the machine readable medium 504 may be a portable (e.g., external) storage medium, and may be part of an "installation package."

As described further herein below, the machine readable medium 504 may be encoded with a set of executable instructions 506, 508, 510, 512. It should be understood that part or all of the executable instructions and/or electronic circuits included within one box may, in alternate implementations, be included in a different box shown in the figures or in a different box not shown. In some examples, the instructions 506, 508, 510, 512 may be used to implement various aspects of the system 100 or method 300 described above.

Instructions 506, when executed, cause the processing resource 502 to receive an input/output (I/O) request. Instructions 508, when executed, cause the processing resource 502 to identify to which file system instance of a plurality of file system instances the received I/O request belongs and to forward the I/O request to the identified file system instance. In some implementations, instructions 506 and 508 may be utilized in and carried out by the demultiplexer 102 that is executing on the processing resource 502.

Instructions 510, when executed, cause the processing resource 502 to cause to tag the I/O request with an identifier associated with the file system instance identified by instructions 508. In some implementations, instructions 510 may be utilized in and carried out by a file system instance 104 that is executing on the processing resource 502, and more particularly, the file system instance 104-1 identified by instructions 508. Different file system instances may have a different respective identifier for tagging I/O requests.

Instructions 512, when executed, cause the processing resource 502 to identify an extent pool to which the I/O request is to be allocated based on the identifier tagged to the I/O request by instructions 510. The identified extent pool may be among a plurality of extent pools created on persistent storage. For example, instructions 508 may include instructions to hash the identifier tagged to the I/O request to index the extent pool. In some implementations, instructions 512 may be utilized in and carried out by a volume manager 106 that is executing on the processing resource 502.

Figure 6:
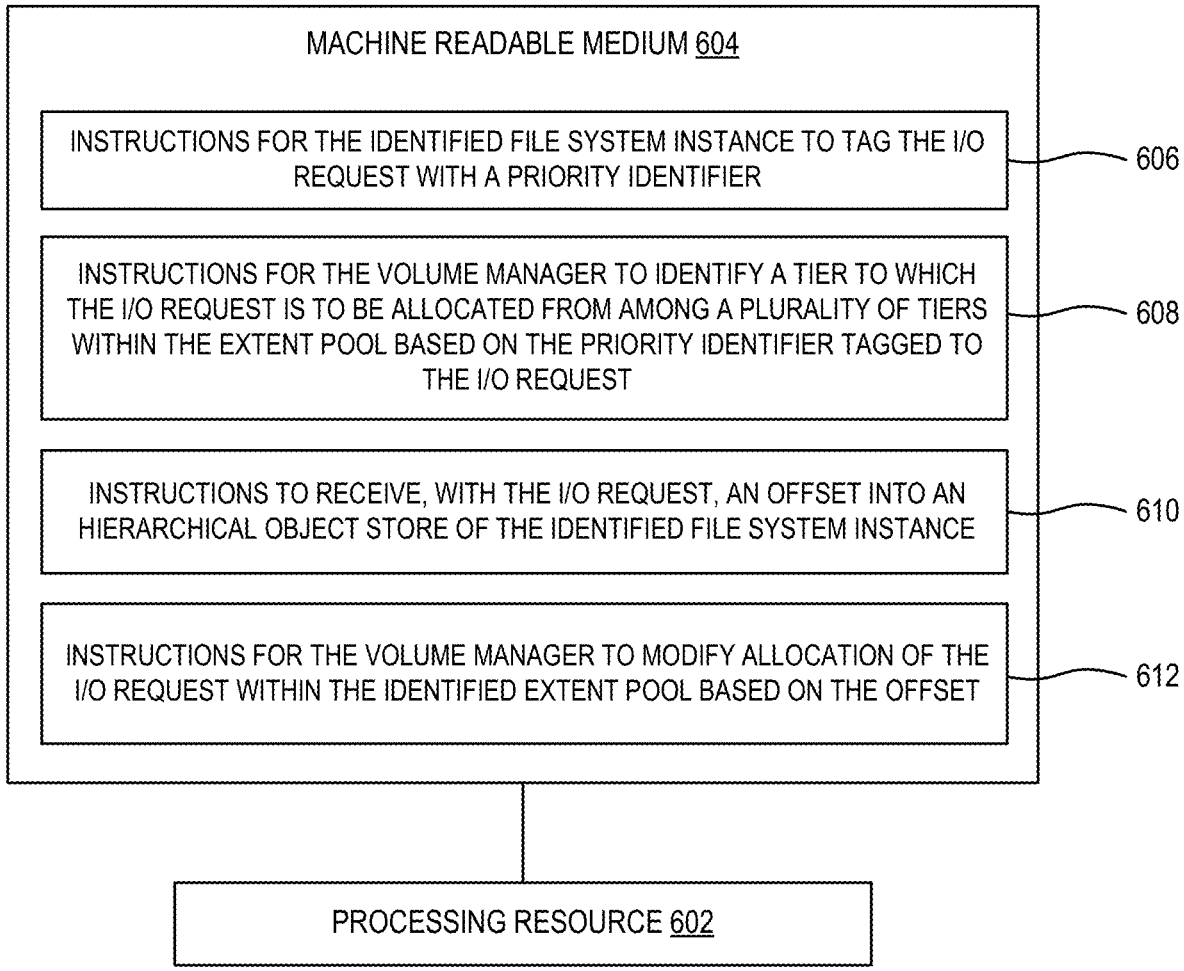
FIG. 6 is a block diagram depicting a non-transitory, machine readable medium encoded with example instructions to identify an extent pool based on a file system instance identifier and to allocate within the extent pool.

FIG. 6 depicts a processing resource 602 coupled to a non-transitory, machine readable medium 604 encoded with example instructions. The processing resource 602 and the machine readable medium 604 may be analogous in many respects to the processing resource 502 and the machine readable medium 504, respectively.

The machine readable medium 604 may be encoded with a set of executable instructions 606, 608, 610, 612. It should be understood that part or all of the executable instructions and/or electronic circuits included within one box may, in alternate implementations, be included in a different box shown in the figures or in a different box not shown. Some implementations of may include more or fewer instructions than are shown in FIG. 6. In some implementations, one or more of the instructions 606, 608, 610, 612 may operate in combination (e.g., sequentially or concurrently) with one or more of the instructions 506, 508, 510, 512 described in FIG. 5. In some implementations, the instructions 606, 608, 610, 612 may implement various aspects of system 100, method 300, or method 400 described above.

Instructions 606, when executed, may cause the processing resource 602 to tag an I/O request with a tiering hint. In some implementations, the instructions 606 may be executed in sequence with or concurrently with instructions 510 described above. Instructions 606 may be utilized in and carried out by a file system instance (e.g., 104-1). Instructions 608, when executed, may cause the processing resource 602 to prevent tier migration of data related to the I/O request responsive to the tiering request tagged by instructions 606, once the I/O request has been allocated to an identified extent pool (e.g., extent pool identified by instructions 512 described above). Instructions 608 may be utilized in and carried out by a volume manager 106 that is executing on the processing resource 502.

Instructions 610, when executed, may cause the processing resource 602 to receive a file address with an I/O request. In some implementations, instructions 610 may be a modification to instructions 506, and also may be utilized in and carried out by demultiplexer 102.

Instructions 612, when executed, may cause the processing resource 602 to modify allocation of the I/O request within an extent pool based on the file address (e.g., an extent pool identified by executing instructions 512). Instructions 612 may be utilized in and carried out by the volume manager 106.

In some implementations, instructions 612 may include instructions to prevent tier migration of data related to the I/O request in response to a high frequency of occurrence related to the file address. In some implementations, instructions 612 may include instructions to allocate the I/O request to a portion of the extent pool in a physical layout that matches a logical layout associated with the file address.

In the foregoing description, numerous details are set forth to provide an understanding of the subject matter disclosed herein. However, implementation may be practiced without some or all of these details. Other implementations may include modifications and variations from the details discussed above. It is intended that the following claims cover such modifications and variations.

What is claimed:

1. A system comprising:
a first file system instance to tag a first input/output (I/O) request belonging to the first file system instance with a first file system instance identifier associated with the first file system instance, the first I/O request regarding data of a first virtual machine, the first file system instance identifier to be passed downstream with the tagged I/O request, wherein the first file system instance is among a plurality of file system instances, each file system instance being associated with a respective virtual machine and having a different respective file system instance identifier for tagging I/O requests, including the first file system instance being associated with the first virtual machine;
a demultiplexer upstream of the plurality of file system instances to:
receive I/O requests, and
forward each of the I/O requests to a respective file system instance of the plurality of file system instances based on a determination of to which of the plurality of file system instances each of the I/O requests belong; and
a volume manager downstream of the plurality of file system instances to identify, based on the first file system instance identifier passed downstream with the tagged I/O request, an extent pool, from among a plurality of extent pools of a storage, to which the tagged I/O request is to be allocated, wherein each extent pool includes a plurality of extents, each extent being a contiguous block of storage, and wherein each I/O request relating to the first virtual machine is to be allocated to the identified extent pool.

2. The system of claim 1, further comprising an object store to perform inline deduplication on I/O requests from the plurality of file system instances upstream of the volume manager.

3. The system of claim 1, wherein a quantity of the file system instances is greater than a quantity of the extent pools, and the volume manager is to identify the extent pool based on the first file system instance identifier by hashing the first file system instance identifier of the tagged first I/O request.

4. The system of claim 1, wherein,
the extent pool identified based on the first file system instance identifier includes different tiers,
the first file system instance is to tag the first I/O request belonging to the first file system instance with a priority identifier, and
the volume manager is to identify, within the identified extent pool identified based on the first file system instance identifier, a tier from among the different tiers to which the tagged I/O request is to be allocated.

5. The system of claim 1, wherein:
the first I/O request as received by the demultiplexer includes a file address,
the first file system instance is to pass the file address downstream with the tagged first I/O request, and
the volume manager is to modify allocation of the tagged first I/O request within the identified extent pool based on the file address.

6. The system of claim 5, wherein the volume manager is to modify allocation of the tagged first I/O request within the identified extent pool based on the file address by preventing migration of data related to the tagged first I/O request in response to a high frequency of occurrence related to the file address.

7. The system of claim 5, wherein the volume manager is to modify allocation of the tagged first I/O request within the identified extent pool based on the file address by allocating the tagged first I/O request to a portion of the identified extent pool in a physical layout that matches a logical layout associated with the file address.

8. A method comprising:
receiving, at a demultiplexer, a first input/output (I/O) request;
forwarding, by the demultiplexer, the first I/O request to a first file system instance to which the I/O request belongs, the first I/O request regarding data of a first virtual machine, wherein the first file system instance is one of a plurality of file system instances, each file system instance being associated with a respective virtual machine, including the first file system instance being associated with the first virtual machine and wherein the first file system instance translates a file address of the first I/O request to an object signature in an object tree;
tagging, by the first file system instance, the first I/O request with a first file system instance identifier associated with the first file system instance; and
identifying, by a volume manager, an extent pool to which the I/O request is to be allocated from among a plurality of extent pools of a storage based on the first file system instance identifier tagged to the first I/O request, wherein each extent pool includes a plurality of extents, each extent being a contiguous block of storage, and wherein each I/O request relating to the first virtual machine is to be allocated to the identified extent pool.

9. The method of claim 8, wherein each of the plurality of file system instances has a different respective file system instance identifier for tagging I/O requests.

10. The method of claim 8, wherein the identifying the extent pool includes hashing the first file system instance identifier of the tagged first I/O request.

11. The method of claim 8, further comprising:
tagging, by the first file system instance, the first I/O request with a priority identifier; and
identifying, by the volume manager, a tier to which the first I/O request is to be allocated from among a plurality of tiers within the identified extent pool based on the priority identifier tagged to the first I/O request.

12. The method of claim 8, further comprising
passing, by the first file system instance, the file address with the first I/O request; and
modifying, by the volume manager, allocation of the first I/O request within the identified extent pool based on the file address.

13. The method of claim 12, wherein the modifying includes
preventing tier migration of data related to the first I/O request in response to a high frequency of occurrence related to the file address, or
allocating the first I/O request to a portion of the identified extent pool in a physical layout that matches a logical layout associated with the file address.

14. A non-transitory machine readable medium storing instructions executable by a processing resource, the non-transitory machine readable medium comprising:
instructions to receive a first input/output (I/O) request, the first I/O request regarding data of a first virtual machine;
instructions to identify to which file system instance of a plurality of file system instances the received first I/O request belongs, and to forward the first I/O request to the identified file system instance, wherein each file system instance of the plurality of file system instances being associated with a respective virtual machine, including the identified file system instance being associated with the first virtual machine;
instructions for the identified file system instance to tag the first I/O request with a first identifier associated with the identified file system instance; and
instructions for a volume manager to identify an extent pool to which the first I/O request is to be allocated, the identified extent pool to be identified from among a plurality of extent pools of a storage based on the first identifier tagged to the first I/O request, wherein each extent pool includes a plurality of extents, each extent being a contiguous block of storage, and wherein each I/O request relating to the first virtual machine is to be allocated to the identified extent pool,
wherein each of the plurality of file system instances has a different respective identifier for tagging I/O requests.

15. The non-transitory machine readable medium of claim 14, wherein the instructions to identify the extent pool includes instructions to hash the first identifier tagged to the first I/O request to index the extent pool.

16. The non-transitory machine readable medium of claim 14, further comprising instructions for the identified file system instance to tag a second I/O request associated with a metadata object generated by the identified file system instance with context data.

17. The non-transitory machine readable medium of claim 14, further comprising:
instructions for the identified file system instance to tag the first I/O request with a priority identifier; and
instructions for the volume manager to identify a tier to which the first I/O request is to be allocated from among a plurality of tiers within the identified extent pool based on the priority identifier tagged to the first I/O request.

18. The non-transitory machine readable medium of claim 15, further comprising:

instructions for the identified file system instance to tag the first I/O request with a tiering hint; and instructions for the volume manager to prevent tier migration of data related to the first I/O request responsive to the tiering hint, once the first I/O request has been allocated to the identified extent pool.

19. The non-transitory machine readable medium of claim 15, further comprising:

instructions to receive, with the first I/O request, a file address; and instructions for the volume manager to modify allocation of the first I/O request within the identified extent pool based on the file address.

20. The non-transitory machine readable medium of claim 19, where the instructions to modify allocation include:

instructions to prevent tier migration of data related to the first I/O request in response to a high frequency of occurrence related to the file address; or instructions to allocate the first I/O request to a portion of the identified extent pool in a physical layout that matches a logical layout associated with the file address.

* * * * *